United States Patent [19]
Tessmann

[11] 3,934,784
[45] Jan. 27, 1976

[54] METHOD FOR INTERJOINING STRANDED WIRE CABLE ENDS

[75] Inventor: Alfred H. Tessmann, Largo, Fla.

[73] Assignee: Industrial Research and Development Corporation, Largo, Fla.

[22] Filed: May 27, 1975

[21] Appl. No.: 580,565

[52] U.S. Cl. .............. 228/125; 228/160; 228/175; 228/904; 29/628; 219/58; 219/97
[51] Int. Cl.² ........................................ H01R 43/02
[58] Field of Search ........ 29/628; 228/13, 904, 125, 228/175, 160; 219/58, 97

[56] References Cited
UNITED STATES PATENTS

| 3,340,596 | 9/1967 | Rozmus | 228/904 X |
| 3,826,000 | 7/1974 | DuRocher et al. | 29/628 X |
| 3,828,601 | 8/1974 | Tessmann | 228/125 X |

Primary Examiner—Al Lawrence Smith
Assistant Examiner—K. J. Ramsey
Attorney, Agent, or Firm—McCaleb, Lucas & Brugman

[57] ABSTRACT

A combined thermal welding and cold upsetting method for interjoining opposing ends of stranded wire conductor cables in which the individual strands of each cable end are first metallurgically bonded to an intervening solid metal junction member which is then mechanically upset, cold worked and partially removed to provide a relatively thin joint or interface section of solid metal extending between and interjoining the multiple cable strands; the junction section having the circumferential configuration and cross-sectional area of the parent cables and selectively regulated strength properties.

9 Claims, 10 Drawing Figures

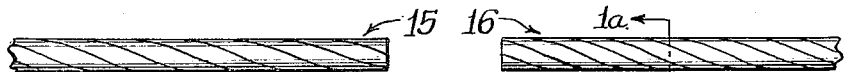
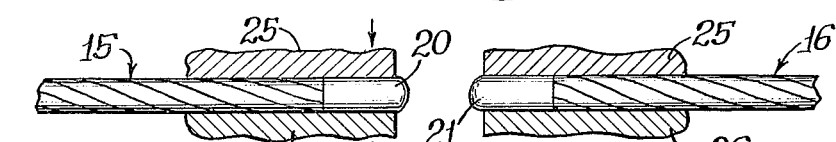
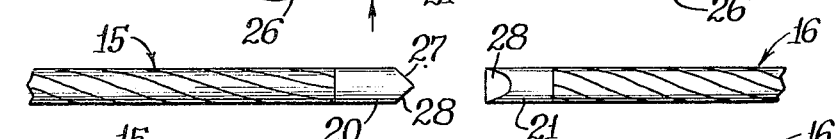
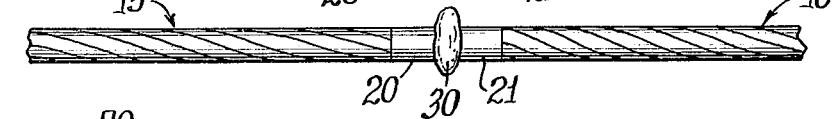
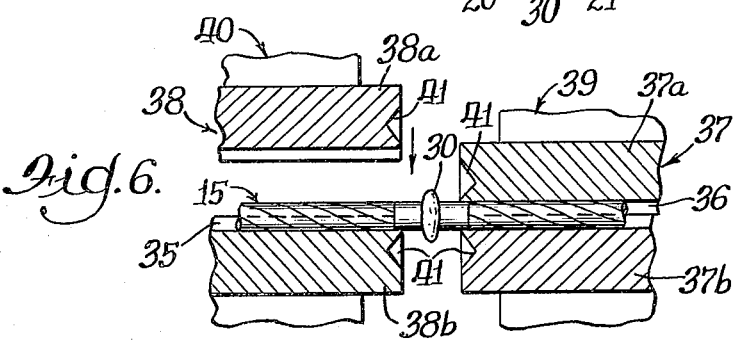
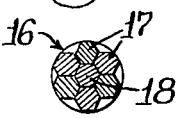
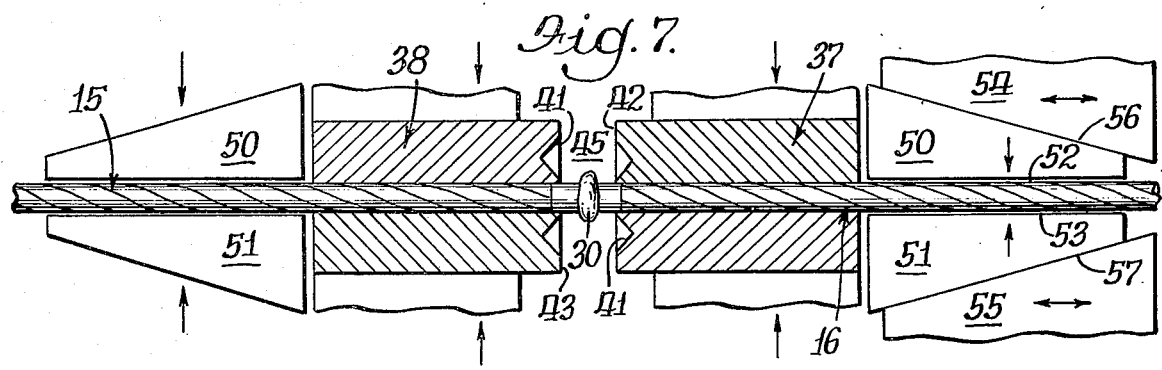
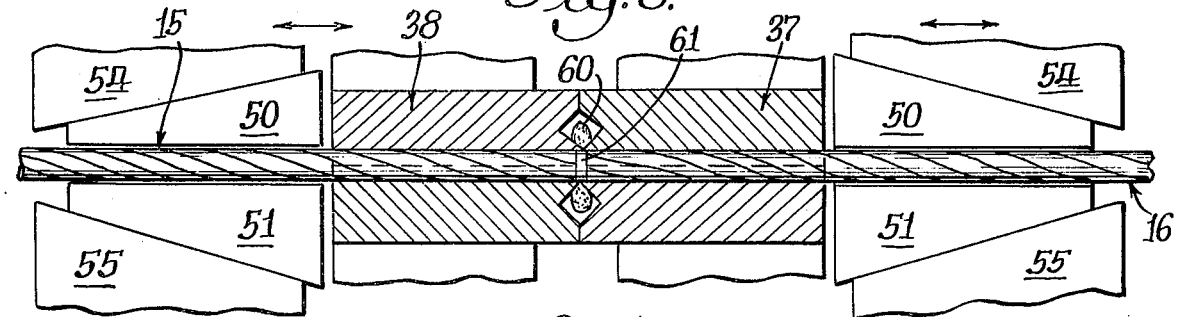

METHOD FOR INTERJOINING STRANDED WIRE CABLE ENDS

BACKGROUND OF THE INVENTION

This invention relates generally to metal joining processes and more particularly to an improved method for interjoining multiple stranded wire cable ends by providing a solid metal junction therebetween having the same circumferential configuration and equivalent cross-sectional area of the parent cables and selected strength factors.

In the manufacture of wire, particularly electrical conductor wire made from non-ferrous materials such as aluminum, copper and their common conductor alloys, the manufacturer is confronted with the serious problem of interjoining the terminal ends of wire sections to form continuous lengths or runs. Such junction problem is usually encountered during continuous wire drawing and coating operations wherein wire diameters and cross-sections are reduced in size or surface coating materials applied thereabout to achieve a finished wire product preferably having continuity of form, electrical conductivity and strength and from which finite lengths are cut for sale to the customer or futher processing.

In my prior U.S. Pat. No. 3,828,601 issued Aug. 13, 1974, an apparatus and method for effecting junctions between the ends of solid metal wire sections are described. Briefly, as therein taught, the method utilizes two basic procedures, namely, interjoining solid wire ends by thermal butt welding techniques to insure a true metallurgical bond therebetween, and mechanically upsetting and cold working the welded joint and bond zone to remove the heat affected metal of the joint and to provide a junction interface between the individual solid wires having at least the original metallurgical and physical properties of the parent cable metal.

When such individual wires are fabricated into more complex products, such as stranded wire electrical conductor cables, a number of spools of wire are loaded in a stranding machine where they are continuously twisted and formed into multi-wire cables. As this stranding process proceeds, the terminal end of each individual wire must be joined to the starting end of a new spool of wire without interrupting the process. While the teachings set forth in my aforesaid patent are highly successful for the purposes of interjoining such opposing ends of the individual solid metal wires, in the above outlined cable making process, such teachings are not correspondingly immediately applicable to the interjoining of the multiple strands at the cable ends.

In the first instance, in contrast to the relative ease of effecting a good molecular interjunction between individual solid metal wire ends by normal electric butt welding procedures for instance, use of heat and pressure for interjoining the multiple strand cable end is generally unsuccessful. This failure is principally due to the excessive oxidation of the individual cable strands during the normal butt welding operations and the further tendency of the wire strands to radially bulge and separate under axial load. Thus the end result of an attempted butt welding and cold upsetting of opposing multiple strand cable ends is generally unreliable, inconsistent and productive of a highly oxidized bond zone which is very brittle and practically devoid of the desired metallurgical and physical properties of the parent cables. Consequently cables so joined are not ideally suited to further operations of the cable fabricating processes such as extruding an insulating coating thereover, since such joints or junctions lack the necessary strength and ductility to withstand the applied pulling forces and are easily broken. Any breakage of the cable during such continuous insulation applying operations, for example, is time consuming, dangerous and expensive, and may damage the production equipment to an extent requiring costly shut down of the entire production line.

By current practice, cable joints formed by known welding, brazing, friction welding, cold upsetting and other known techniques, frequently fail to meet necessary quality and strength specifications and usually must be removed from the completed cable and scrapped, leading to economic loss of both material and man hours. In other instances, such joints as are acceptable often fail in use, requiring costly onsite or field repairs.

As a result of the foregoing briefly outlined difficulties, the interjoining of stranded wire cable ends is and has been a major production and economic burden in the wire making industry, heretofore defying successful solution.

In brief, my present invention advances and adopts certain of the basic teachings and concepts found in my aforesaid prior patent to a successful method for the interjunction of stranded wire cable ends. To this end, I have discovered that if the end of a multi-strand conductor cable is first thermally bonded to a solid metal junction section made of the same material as the conductor strands, such as aluminum, copper, and their common conductor alloys, two such solid metal junction sections may be successfully and conveniently bonded by electrical butt welding techniques. Thereafter the welded joint area of the solid metal junction sections and heat affected zones adjacent thereto may be mechanically cold worked, formed and removed to produce a satisfactory solid metal interface or joint section between two cable ends. Moreover, the degree of cold working and forming of the junction section and adjacent areas of the stranded cables may be selectively controlled to produce a joint area having the circumferential configuration and cross-sectional area of the parent cables and selected strength properties.

It is an important object of this invention to provide a new and improved method of interjoining ends of stranded wire cables.

It is a further object of this invention to provide an improved method, as aforesaid, in which the junction between the joined cables comprises a true metallurgical bond having selectively controlled metallurgical and physical properties.

It is another object of this invention to provide an improved method of interjoining stranded wire conductor cable ends in which the resulting junction or joint area has the circumferential configuration and cross-sectional area of the joined parent cables.

Having thus described my invention, the above and further objects, features and advantages thereof will be understood from the following description of a preferred embodiment thereof, taken in conjunction with the accompanying drawings, as representing the best mode presently known to enable those skilled in this art to practice its teachings.

In the drawings:

FIG. 1 is a schematic illustration of a pair of stranded cable end portions to be interjoined in accordance with this invention;

FIG. 1a is a cross-sectional showing of the cable taken substantially along vantage line 1a–1a of FIG. 1 and looking in the direction of the arrows thereon;

FIG. 2 is a schematic view, similar to FIG. 1, showing the cable end portions with junction sections attached thereto;

FIG. 3 is another schematic illustration, showing the shaping of the junction sections in radial forming dies;

FIG. 4 schematically illustrates formation of the junction section ends for an interconnection by electric butt welding;

FIG. 5 schematically illustrates such cable end portions interjoined by welded interconnection of the junction sections;

FIG. 6 is a schematic illustration in plan or side elevation showing the loading of the welded junction sections and cable end portions in opposed upsetting and forming dies;

FIG. 7 is another schematic illustration, similar to FIG. 6, showing the joined cable end portions fully loaded in the upsetting and forming dies and illustrating the means for clamping and gripping the cables for purposes of imposing axial thrust forces thereon;

FIG. 8 is a schematic view similar to FIG. 7, at the completion of the upsetting and forming operation and showing the removal of the upset portions of the welded junction sections; and FIG. 9 is a schematic illustration in top or side elevation depicting the finished product according to this invention.

Turning now to the particulars of the preferred embodiment of the improved method according to this invention, as illustrated in the accompanying drawings, initial reference is made to FIGS. 1 and 1a wherein two end portions 15 and 16 of typical stranded wire conductor cables to be interjoined by my improved method are shown. As noted in particular in FIG. 1a, each of the cable portions is made up of six individual solid metal wire strands 17 twisted about a solid central core strand 18 according to conventional cable making practice.

As best shown in FIG. 2, each of the cable end portions 15 and 16 is joined to a junction section 20 and 21, respectively, comprising a generally axially extending solid metal section made of the same conductor material as the parent wire strands. Such junction sections may be individual lengths of metal rod or comprise molten metal, buildup at the cable ends, for example. In either event, the attachment of the junction sections to the wire cable ends is accomplished successfully, while avoiding damaging excessive oxidation of the cable strands, by known controlled atmosphere welding techniques, such as the familiar Tungsten inert gas process, more commonly referred to as "Tig" welding. It is also within the ambit of this invention that the buildup of the junction sections may be accomplished by other techniques, such as by dipping the cable ends into a molten metal or employing other equivalent controlled atmosphere welding procedures. In any event, in accordance with the herein described invention, the resulting junction sections 20 and 21, as shown, are relatively amorphous solid metal axial extensions or projections of the outer or terminal ends of the cables. It is important to note that the terminal cable ends may be coupled to their respective junction sections remotely of the stranding equipment and long prior to the time actual interjunction of successive cable ends is necessary, thus minimizing the time required to effect continuous interconnection between adjacent cable spools during continuous insulation applying operations, for example.

Generally, after the amorphous shaped extension sections 20 and 21 shown, are secured to or formed on the cable ends, as hereinabove described, it is preferred that such be radially formed and shaped to match the general circumferential configuration of the associated cable portions 15 and 16. This may be carried out in the manner illustrated in FIG. 3 by placing a substantial axial length of each integrated cable and extension section in a cylindrical die cavity, between opposing radially movable forming dies 25 and 26, and closing such dies therearound to radially encompass and circumferentially compress and shape the relatively soft annealed material of the extension section to match the associated cable. This procedure generally conforms the circumferential or exterior configuration and cross-sectional area of such extension section to that of the related cable portion. In the illustrated case of FIG. 3, it will be recognized that after the radial die forming operation therein depicted, the junction sections 20 and 21 comprise substantially cylindrical axial projections or extensions of the cable end portions.

Inasmuch as it is intended that the junction sections 20, 21 be thermally bonded, as by electric butt or other thermal welding procedures, it is preferable, but not essential, that the outer ends thereof be nipped off to form angularly intersecting or chiseled end surfaces 27 and 28 thereon, preparatory to the welding operation as shown in FIG. 4. This insures clean, bright, non-oxidized surfaces for the welding process, and provides good electrical contact and a clean bond zone for electrical butt welding.

After preparation of the ends of the junction sections 20 and 21 as above described, the same are ready for interconnection by thermal bonding. It is preferred that electric butt welding procedures be followed for this purpose since such may be accomplished quickly in a conventional electric butt welding machine by placing the chiseled ends of the junction sections in contact while applying electrical energy therethrough and thermally merging the junction sections under slight axial pressure in known fashion. As a result of the electric butt welding step, an intermediate raw product is formed, as illustrated schematically in FIG. 5 of the drawings, from which it will be recognized that the welded interface and bonded zone between the unified junction sections protrudes radially outwardly of the joined sections 20 and 21 in a generally annular weld zone bulge, as designated at 30 in FIG. 5. While this bulge or weld zone can be removed manually, as by grinding or filing, it is preferred that such procedures not be followed because of attendant damage to the interbonded sections 20, 21.

It will be recalled that one of the objectives of this invention is to provide a molecularly interbonded junction or joint between joined cable ends which emulates both the physical and metallurgical properties of the parent stranded cables. Inasmuch as the thermal welding operations used for interjoining the junction sections 20 and 21 to each other and to their associated cable ends effectively anneals axially adjacent material of the junction sections as well as adjacent axial portions or zones of the cable strands, themselves, it is preferred that these annealed zones be hardened and densified to provide sufficient ductility and tensile strength for the cable joint to withstand the pulling forces applied during the continuous cable making operations, such as takes place, for example, in continuously extruding insulation materials about the cable.

While it is possible to employ other known means and apparatus for this purpose, one preferred way of accomplishing this procedure is in accordance with the basic teachings and operating techniques of the apparatus set forth in my aforesaid U.S. Pat. No. 3,828,601, or its equivalent. Accordingly, substantial axial sections of the cable ends on opposite sides of the weld zone or bulge 30 are enclosed in circumferentially conforming openings of axially spaced pairs of dies and gripper means capable of being axially shifted relative to one another, so as to axially compress, radially upset and remove the annealed material of the weld zone while forming a finished joint between the joined cable ends. A more detailed description of apparatus capable of performing the above desired procedures is more fully expounded in my aforesaid U.S. Pat. No. 3,828,601, however, representative elements thereof for carrying out the upsetting, forming and removing operations according to the present inventive method are depicted in FIGS. 6–8 of the drawings, to which reference is now made.

As shown in FIG. 6, the cable end portions 15 and 16 are located in axially aligned, smooth ground cylindrical die openings 35 and 36 of opposed axially spaced split die assemblies 37 and 38, made up of two half dies 37a, 37b and 38a, 38b, respectively. The die halves are held in suitable die carrier assemblies 39 and 40 which are power actuated as by hydraulic rams, whereby to independently shift the half die portions of each die assembly toward and away from one another to accordingly close an open the same. The raw joined cable product of FIG. 5 is loaded in and between the die halves while the latter are in their opened condition, as illustrated in the left hand portion of FIG. 6. Normally the lower sections of the die assemblies 37b and 38b remain stationary while the upper half portions 37a and 38a are moved into engagement therewith once the cable has been located in the die openings 35 and 36.

Each of the die halves also is formed with a semiannular recess 41 in its outer or nose end wall 42 or 43, respectively, such recesses having a generally V-shaped cross-section and intersecting the central die openings 35 and 36 when the dies are closed to provide an annular knife edge surrounding each such opening.

The loaded condition of the cable portions with the die assemblies closed radially thereabout is illustrated in FIG. 7 of the drawings from which it will be recognized that the weld zone 30, between the junction sections 20, 21 is disposed centrally of the space or gap 45 between the axially spaced ends of the die assemblies 37 and 38. The spacing or gap 45 is adjustable to accommodate variations in length of the junction material to be upset and removed by the upsetting operation, as will be described in greater particular hereinafter.

As shown best in FIG. 7, substantially the full axial length of the interjoined junction sections 20, 21 is located between the spaced end walls of the die assemblies, with the respective heat affected areas or zones of connection between such sections and their respectively associated cable portions 15 and 16 importantly being located within the central die openings just slightly past the annular knife edges surrounding the outer ends of the die openings.

It is to be noted in regard to FIG. 7 in particular, that the closed condition of the die assemblies 37 and 38 about the cable portions 15 and 16 serves to confine a relatively substantial axial portion of each of the cable end portions while the diameter of the central die openings 35 and 36 is maintained substantially equal to or just slightly greater than the diameter of the confined cables. This serves to radially confine and straighten the substantial axial cable portions therewithin, but without radially gripping the same. It further is to be noted that while the central die openings 35 and 36 have hereinabove been shown and described as being cylindrical, other cross-sectional configurations therefor may be used, such as polygonal; the essential cross-sectional characteristic of the central die openings being that of conforming to the circumferential or external configuration of the cables with which they operate.

In order to provide sufficient gripping of the cable sections to impose required axial thrust thereon for the purpose of radially upsetting and severing and removing the material between the spaced die ends, identical pairs of cooperating gripping blocks 50, 51 are mounted axially outwardly of one end of each of the die assemblies 37 and 38 and immediately adjacent thereto. Each of the gripping blocks 50 and 51 is provided with an elongated gripping groove 52 and 53, respectively, for partly surrounding an elongated cable length or section disposed therein. The gripping blocks are mounted in axial alignment with the die blocks so that the openings 35 and 36 of the latter are coaxial with the gripping grooves 52 and 53 of the closed gripper blocks. Be that as it may, radial gripping forces are applied to the cable sections within the gripping blocks by actuation of reciprocably movable, parallel wedge blocks 54 and 55 operatively associated with hydraulic rams or other power actuator means. It will be understood with reference particularly to the right hand portion of FIG. 7 that movement of the wedge blocks 54 and 55 toward the dies initially effectuates relative inward movement of the gripper blocks in response to inter-action of the mating sloping surfaces 56 and 57 thereof. Inter-engaging means are provided between the wedge and gripper blocks to positively move the gripper blocks in response to wedge block movement. Thus movement of the wedge blocks away from the die assemblies, as viewed in FIG. 7, withdraws the gripper blocks 50 and 51 to release the cable means therewithin.

In addition to the described initial radial gripping action imposed by the gripper blocks 50 and 51, additional movement of the wedge blocks toward die assemblies 37 and 38 imposes axial thrust forces on the gripped cable sections as well as on the closed die block assemblies 37 and 38 to thrust them toward one another until the dies are substantially abutting, as shown in FIG. 8.

From FIG. 8 it will be readily understood that as the die assemblies 37 and 38 are axially closed together, the material between the spaced end walls 42 and 43 thereof is radially upset under the opposed axial forces applied on the cable end portions. Such upsetting effectively causes the welded bead or zone 30 (see FIG. 5) between junction sections 20 and 21 as well as the remaining portions of such sections lying between the die ends, to flow generally radially outwardly into the end recesses 41 of the die assemblies (see FIG. 8). Engagement of the knife edges at the mouth of each of the die openings 35 and 36 effectively shears or nips off the upset material, as indicated at 60 in FIG. 8. Upon retraction and opening of the die assemblies for release of the joined cables, which takes place upon reversal of the wedge blocks 54, 55 to release the gripper blocks 50, 51 and opening of the die halves, the upset material 60 is in the general shape of a doughnut or annulus which is usually ruptured and easily removed or, if not, may be readily nipped off and removed, leaving a finished end product as illustrated in FIG. 9 of the drawings comprising the joined end portions 15 and 16 of the cable and a short smooth walled cylindrical interface or joint section 61 therebetween.

In addition to removal of the annealed material of the weld section 30 and the adjacent heat affected and remainder portions of the junction sections 20, 21 disposed between the die ends, as illustrated in FIG. 8, the attendant axial loading of the portions of the junction sections 20, 21 and cables 15 and 16 within the die cavities are also cold worked. Thus the annealed or heat affected material or zones resulting from the thermal bonding of the junction sections to the cable ends are effectively cold worked to selected strength levels. Inasmuch as such worked portions of the junction sections 20, 21 and the cable ends are radially confined within the central die openings during the described upsetting operation, radial spreading of the cable strands is effectively prevented while a junction zone is formed between the cable ends which not only conforms with original cable circumference, but exhibits the desired metallurgical and physical properties.

It is to be recognized that depending on the axial extent of the portions of the junction sections 20 and 21 disposed between the spaced ends 42 and 43 of the die assemblies, the foregoing described procedure of upsetting and removing the material between the spaced die ends may be carried out with one or more successive upsetting operations to minimize the axial extent of the finished joint zone 61. It further will be appreciated that the material comprising the interjoined junction sections 20, 21 and the portions of the cables 15 and 16 contiguous thereto, may be cold worked one or more times, as selected, depending on the number of upsetting operations involved, to effectively create a cable junction of desired strength; the desired criteria being that of producing a joint between the cables that is capable of withstanding the applied forces attendant continuous cable forming operation, such as the extruding of insulation coatings thereabout.

In practice, the above described method has successfully produced joints or junctions in stranded aluminum conductor cable which satisfy and meet the requirements for ASTM specified "soft drawn and" "medium hard drawn" cable, typically having tensile strengths within the range of 11,000 to 15,000 p.s.i.

From the foregoing, it is submitted that those familiar with the art will readily recognize and appreciate the novel advancement achieved by the present inventive method and will appreciate the fact that while the same has been described in conjunction with a specific embodiment and exemplary apparatus for carrying out its various steps, changes and substitutions may be resorted to without departing from the spirit and scope of the described invention as defined in the following appended claims.

The embodiments of the invention in which an exclusive property or privilege is claimed are defined as follows:

1. A method of interjoining the ends of multiple strand wire cables comprising the steps of: metallurgically bonding a solid section of like metal coaxially to and between opposing end portions of the cables, and upsetting and removing a substantial portion of said section to effect a solid metal joint between said end portions having substantially the circumferential configuration of the cables.

2. The method of claim 1 wherein the upsetting of said section is selectively regulated to produce a finished joint between the cables of preselected tensile strength.

3. The method of claim 1, wherein said end portions of the cable are radially confined throughout the upsetting and removing of said substantial portion.

4. A method of interjoining the ends of multiple strand electrical conductor cables comprising the steps of: thermally bonding a solid section of like metal to and between the ends of the cables, radially confining substantial axial end portions of the cables including the axial adjacent junctions thereof with said section, simultaneously axially and radially upsetting and forming a substantial portion of said section between said confined end portions and cold working the remainder thereof and the axially adjacent confined portions of said cables to produce a finish joint between the cables having the circumferential configuration and cross-sectional area of said cables and selected tensile strength, and removing the upset material of said section to finish said joint.

5. A method of interjoining the ends of multiple strand electrical conductor cables comprising the steps of: thermally bonding a section of like solid metal coaxially to one end of each of the cables to be joined, thermally inter-bonding said sections, upsetting and removing the heat affected material of said inter-bonded sections while simultaneously forming the exterior thereof to the circumferential configuration of said cables, and selectively cold working the remainder of said sections and adjacent thermally affected material at said cable ends sufficiently to produce a solid metal junction therebetween having the strength and properties of soft drawn to medium hard drawn conductor cable.

6. The method of claim 5, wherein said thermal bonding of a said section to said cable end is conducted in a non-oxidizing atmosphere.

7. The method of claim 5, wherein each said section is amorphously shaped after bonding with a cable end, and is thereafter formed to substantially the circumferential shape of its associated cable end prior to the thermal inter-bonding of said sections.

8. The method of claim 5, wherein the cables are aluminum, and the tensile strength of said junction is within the range of 11,000 to 15,000 p.s.i.

9. The method of claim 5, wherein the thermal inter-bonding of said sections is accomplished by electrical butt welding.

* * * * *